United States Patent [19]

Fujisawa et al.

[11] 3,852,395
[45] Dec. 3, 1974

[54] TRIS-(3,5-DI-T-BUTYL-4-HYDROXYPHENYLTHIO) PHOSPHINE

[75] Inventors: Tamotsu Fujisawa, Yamato; Michio Aiba, Sagamihara, both of Japan

[73] Assignee: Sagami Chemical Research Center, Tokyo, Japan

[22] Filed: July 31, 1973

[21] Appl. No.: 384,386

[30] Foreign Application Priority Data
Aug. 3, 1972  Japan.............................. 47-77288

[52] U.S. Cl............... 260/953, 260/45.95, 260/976
[51] Int. Cl. ............................................... C07f 9/18
[58] Field of Search..................... 260/953, 976, 967

[56] References Cited
UNITED STATES PATENTS
2,824,847  2/1958  Fath.............................. 260/967 X
2,966,510  12/1960  Dunn et al. ..................... 260/967 X
3,683,054  8/1972  Wollensak et al. ................. 260/953

Primary Examiner—Lorraine A. Weinberger
Assistant Examiner—Richard L. Raymond
Attorney, Agent, or Firm—Flynn & Frishauf

[57] ABSTRACT

There is disclosed a novel substance: tris-(3,5-di-t-butyl-4-hydroxyphenylthio)phosphine which is especially useful as a stabilizer for polyolefin compositions. Said phosphine can be prepared by the reaction of 4-mercapto-2,6-di-t-butylphenol or an alkali-metal salt thereof with phosphorous trichloride in the presence of a solvent.

1 Claim, No Drawings

TRIS-(3,5-DI-T-BUTYL-4-HYDROXYPHENYLTHIO) PHOSPHINE

BACKGROUND OF THE INVENTION

1. Field of the Invention

The present invention relates to a novel substance, tris-(3,5-di-t-butyl-4-hydroxyphenylthio)phosphine shown below:

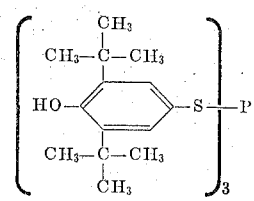

and a process for its preparation. More particularly, it relates to a novel substance, tris-(3,5-di-t-butyl-4-hydroxyphenylthio)phosphine itself which is useful as an antioxidant and as a stabilizer, and is also useful as an intermediate for the preparation of pharmaceuticals, agricultural and commercial chemicals; and to a process for the preparation of said compound which comprises reacting 4-mercapto-2,6-di-t-butylphenol or an alkali-metal salt thereof with phosphorous trichloride in the presence of a solvent.

2. Description of the Prior Art

It is known that phenols react readily with phosphorous trichloride to give triphenyl phosphite. Accordingly, it has been considered difficult to prepare tris-(4-hydroxyphenylthio)phosphines by the reaction of thiophenols having hydroxyl radical at para position with phosphorous trichloride because the phenolic hydroxyl group would react with phosphorous trichloride, and such an attempt has not been described as far as the present inventors know.

SUMMARY OF THE INVENTION

The present invention relates to a novel compound, tris-(3,5-di-t-butyl-4-hydroxyphenylthio)phosphine which is useful in many fields as described above, and to a process for its preparation. The object compound of the present invention gives a good oven life and a molecular weight degradation effect to polyolefins, and especially to polypropylene.

The process of the present invention for the preparation of tris-(3,5-di-t-butyl-4-hydroxyphenylthio)phosphine is characterized in that 4-mercapto-2,6-di-t-butylphenol or an alkali-metal salt thereof is allowed to react with phosphorous trichloride in the presence of a suitable solvent. Because the hydroxyl group of the phenol used as the starting material for the present process is protected by bulky t-butyl groups on both the ortho positions to the hydroxyl group and, as a result, the mercapto group at the para position to the hydroxyl group reacts preferentially to give successfully tris-(3,5-di-t-butyl-4-hydroxyphenylthio)phosphine which has not hitherto been prepared. Thus, one of the characteristics of the present invention consists in the use of a 4-mercaptophenol having a peculiar structure.

In the process of the present invention, any solvent may be used provided that which does not react with and which dissolves both the starting material and the reaction product, and benzene is an example of a preferable solvent.

The reaction temperature of the present process may be varied within the range of 0° – 150°C and preferably between room temperature and the reflux temperature of the reaction system. The pressure used in the present process is not limited provided that the reaction system is kept at a liquid state. No particular advantage is observed by the use of a high pressure. The reaction time may vary widely depending upon the reaction conditions, but is usually within the range of 0.5 to 12 hours.

Hydrogen chloride gas is evolved during the reaction of the present invention, and a basic substance may be used in the system as an acid acceptor; both inorganic basic substance and organic basic substance may be used for this purpose, and pyridine and triethylamine are examples of the preferred compounds.

The ratio of the phenol and phosphorous trichloride used in the present process is usually within the range of 0.5 – 2 mole and preferably 1 – 1.5 mole of phosphorous trichloride per 3 mole of the phenol.

The mercapto group at the 4 position of 4-mercapto-2,6-di-t-butyl-phenol, used as the starting material in the process of the present invention, may be in the form of an alkali-metal salt such as sodium salt, and the reaction proceeds smoothly without any difficulty.

DESCRIPTION OF THE PREFERRED EMBODIMENTS

The following examples illustrate the present invention in more detail. These examples should be considered only as an illustration of the present invention and should not be taken in any way as limiting the scope of this invention.

EXAMPLE 1

A solution of 5 g of 4-mercapto-2,6-di-t-butylphenol and 1.4 g of phosphorous trichloride in 35 ml of benzene was heated under reflux for twelve hours. Solvent was then distilled off, n-hexane was added to the viscous residue and the precipitate was collected by filtration to give 4.5 g (87%) of tris-(3,5-di-t-butyl-4-hydroxyphenylthio)phosphine. Recrystallization from ligroin gave pure thiophosphine described above with a m.p. of 215° – 7°C.

| Molecular Formula | | $C_{42}H_{63}O_3S_3P$ |
|---|---|---|
| Elemental Analyses | Calculated: | C 67.88%; H 8.55%. |
| | Found: | C 67.87%; H 8.61%. |
| IR $(cm^{-1})$ | 3550; 2970; 1425; 1240; 875; 475 | |
| NMR (CDCl$_3$) | δ 7.20 (s, 2H); 5.15 (s, 1H); 1.45 (s, 18H) | |

EXAMPLE 2

A solution of 4 g of 4-mercapto-2,6-di-t-butylphenol in anhydrous benzene (30 ml) was added to 0.4 g of sodium hydride and the resulting mixture was heated under reflux for one hour. A solution of 0.8 g of phosphorous trichloride in anhydrous benzene (5 ml) was then added and refluxing was further continued for 3.5 hours. The mixture was then filtered and the solvent of the filtrate was distilled off to give 3.4 g (81% yield) of tris-(3,5-di-t-butyl-4-hydroxyphenylthio)phosphine with a m.p. of 215° – 7°C.

EXAMPLE 3

To a solution of 2 g of 4-mercapto-2,6-di-t-butylphenol and 1 g of triethylamine in 10 ml of benzene, there was added a solution of 0.4 g of phosphorous trichloride in benzene (5 ml). The mixture was stirred for five hours at room temperature. It was then filtered, the solvent of the filtrate was distilled off and the residue was recrystallized from n-hexane to give 1.58 g (75% yield) of tris-(3,5-di-t-butyl-4-hydroxyphenylthio)phosphine melting at 215° – 7°C.

EXAMPLE 4

To an untreated and additives-free polypropylene powder with a melt index of 4.5 g/10 min. at 230°C was added 0.30 wt percent of tris-(3,5-di-t-butyl-4-hydroxyphenylthio)phosphine of the present invention, and pellets were prepared from this composition by using a pelletizing apparatus at a treatment temperature of 200°C. Determination of its melt index gave values of 4.3 g/10 min. at 230°C and 61.7 g/6 min. at 290°C. A sheet with a size of 45 mm × 30 mm with 1 mm thickness was made from the pellets described above on a hot press and its oven life and molecular weight degradation effect were measured. Oven life is defined here as the time (day) required for a sample described above to show deterioration on a gear type aging tester at a constant temperature of 150°C; and molecular weight degradation effect is defined here as the value of melt index of a sheet sample determined at 290°C devided by the value of melt index of the sheet sample determined at 230°C. The following values were obtained:

| | |
|---|---|
| Molecular weight degradation effect | 14.3 |
| Oven life | 20 days |

COMPARATIVE EXAMPLE

The same measurements were performed under identical conditions as described in Example 4 except that trilauryl trithiophosphite was used instead of tris-(3,5-di-t-butyl-4-hydroxyphenylthio)phosphine. The following results were obtained:

| | | |
|---|---|---|
| Melt index | 230°C | 4.9 g/10 min. |
| | 290°C | 54.2 g/6 min. |
| Molecular weight degradation effect | | 11.1 |
| Oven life | | 4 days |

What we claim is:
1. Tris-(3,5-di-t-butyl-4-hydroxyphenylthio)phosphine.

* * * * *